(12) United States Patent
Lombardi et al.

(10) Patent No.: US 12,466,854 B2
(45) Date of Patent: Nov. 11, 2025

(54) PEPTIDE USEFUL FOR THE TRANSPORT OF MOLECULES THROUGH CELL BARRIERS

(71) Applicants: UNIVERSITÉ GRENOBLE ALPES, Saint Martin d'Heres (FR); INSTITUT NATIONAL DE LA SANTÉ ET DE LA RECHERCHE MÉDICALE, Paris (FR)

(72) Inventors: Charlotte Lombardi, Rochefort Samson (FR); Marcelle Moulin, Annecy (FR); Catherine Ghezzi, Grenoble (FR)

(73) Assignees: UNIVERSITÉ GRENOBLE ALPES, Saint Martin d'Hères (FR); INSTITUT NATIONAL DE LA SANTÉ ET DE LA RECHERCHE MÉDICALE, Paris (FR)

( * ) Notice: Subject to any disclaimer, the term of this patent is extended or adjusted under 35 U.S.C. 154(b) by 0 days.

(21) Appl. No.: 18/850,224

(22) PCT Filed: Apr. 11, 2023

(86) PCT No.: PCT/FR2023/050519
§ 371 (c)(1),
(2) Date: Sep. 24, 2024

(87) PCT Pub. No.: WO2023/198985
PCT Pub. Date: Oct. 19, 2023

(65) Prior Publication Data
US 2025/0109169 A1    Apr. 3, 2025

(30) Foreign Application Priority Data
Apr. 11, 2022 (FR) .................... 22/03309

(51) Int. Cl.
*C07K 7/08* (2006.01)
*C07K 16/18* (2006.01)

(52) U.S. Cl.
CPC ............... *C07K 7/083* (2013.01); *C07K 7/08* (2013.01); *C07K 16/18* (2013.01); *C07K 2317/569* (2013.01); *C07K 2319/01* (2013.01)

(58) Field of Classification Search
None
See application file for complete search history.

(56) References Cited

U.S. PATENT DOCUMENTS 10,590,191 B2 *  3/2020   Fagret ................... C07K 16/18

FOREIGN PATENT DOCUMENTS

FR          3 058 143 A1     5/2018
WO      2018/078140 A1       5/2018

OTHER PUBLICATIONS

Mullard, A. Nat Rev Drug Discov. Dec. 2024;23(12):883. doi: 10.1038/d41573-024-00180-7. PMID: 39487218.*
Aug. 8, 2023 International Search Report issued in International Patent Application No. PCT/FR2023/050519.
Zhou et al., "Brain penetrating peptides and peptide-drug conjugates to overcome the blood-brain barrier and target CNS diseases", WIREs Nanomedicine and Nanobiotechnology, 2021, e1695.
Schwarze et al., "In Vivo Protein Transduction: Delivery of a Biologically Active Protein into the Mouse", Science, vol. 285, Sep. 3, 1999, pp. 1569-1572.
Patel et al., "Crossing the Blood-Brain Barrier: Recent Advances in Drug Delivery to the Brain", CNS Drugs, Jan. 18, 2017.
Pardridge, William M, "Blood-Brain Barrier Drug Targeting: the Future of Brain Drug Development", Molecular Interventions, vol. 3, Issue 2, Mar. 2003, pp. 90-105.
Pardridge, William M, "CSF, blood-brain barrier, and brain drug delivery", Expert Opinion on Drug Delivery, 2016.
Oller-Salvia et al., "Blood-brain barrier shuttle peptides: an emerging paradigm for brain delivery", Chem. Soc. Rev., 2016, vol. 45, No. 17, pp. 4690-4707.
Dong, Xiaowei, "Current Strategies for Brain Drug Delivery", Theranostics 2018, vol. 8, Issue 6, pp. 1481-1493.
Boer et al., "Strategies to Improve Drug Delivery Across the Blood-Brain Barrier", Clin Pharmacokinet, 2007, vol. 46, No. 7, pp. 553-576.
Kardani et al., "Cell penetrating peptides: the potent multi-cargo intracellular carriers", Expert Opinion on Drug Delivery, 2019, vol. 16, No. 11, pp. 1227-1258.
Cho et al., "Blood-brain-barrier spheroids as an in vitro screening platform for brain-penetrating agents", Nature Communications, 2017, pp. 1-14.
Bera et al., "Structural Elucidation of the Cell-Penetrating Penetratin Peptide in Model Membranes at the Atomic Level: Probing Hydrophobic Interactions in the Blood-Brain Barrier", Biochemistry, 2016, vol. 55, pp. 4982-4996.
Abbott et al., "Structure and function of the blood-brain barrier", Neurobiology of Disease, vol. 37, 2010, pp. 13-25.

* cited by examiner

*Primary Examiner* — Michael Szperka
(74) *Attorney, Agent, or Firm* — Oliff PLC

(57) ABSTRACT

A new peptide and its use as a vector for the transport of molecules after conjugation through cellular barriers for the diagnosis, prognosis or treatment of pathologies of the central nervous system (CNS).

12 Claims, 7 Drawing Sheets
Specification includes a Sequence Listing.

₃ARQRIWFQNRRRSRKIKK₂₀ ← SEQ ID NO: 9

| Physico-chemical properties | |
|---|---|
| Hydrophobicity <H> | Nonpolar residues |
| -0.120 | Nonpolar residues (n / %) |
| Hydrophobic moment <µH> | 5 / 27.78 |
| 0.257 | Aromatic residues |
| Net charge z | TRP 1, PHE 1, |
| 9 | Special residues |
|  | CYS 0, PRO 0 |
| Polar residues + GLY | |
| Polar residues + GLY (n / %) | |
| 13 / 72.22 | |
| Uncharged residues + GLY | |
| GLN 2, SER 1, ASN 1, GLY 0 | |
| Charged residues | |
| LYS 3, ARG 6 | |
| Hydrophobic face : none | |

Go to screening    Manual mutation    GA mutation

HoxA-13:

₁RQVTIWFQNRRVKEKK₁₆ ← SEQ ID NO: 10

| Physico-chemical properties | Polar residues + GLY (n / %) | Nonpolar residues |
|---|---|---|
| Hydrophobicity <H> 0.054 | 11 / 68.75 | Nonpolar residues (n / %) 5 / 31.25 |
| Hydrophobic moment <µH> 0.117 | Uncharged residues + GLY GLN 2, THR 1, ASN 1, GLY 0 | Aromatic residues TRP 1, PHE 1, |
| Net charge z 5 | Charged residues LYS 3, ARG 3, GLU 1, | Special residues CYS 0, PRO 0 |
| | Hydrophobic face : none | |
| | Manual mutation | GA mutation |

Penetratin:

₁RQIKIWFQNRRMKWKK₁₆ ← SEQ ID NO: 11

| Physico-chemical properties | Polar residues + GLY (n / %) | Nonpolar residues |
|---|---|---|
| Hydrophobicity <H> 0.193 | 10 / 62.50 | Nonpolar residues (n / %) 6 / 37.50 |
| Hydrophobic moment <µH> 0.327 | Uncharged residues + GLY GLN 2, ASN 1, GLY 0 | Aromatic residues TRP 2, PHE 1, |
| Net charge z 7 | Charged residues LYS 4, ARG 3, | Special residues CYS 0, PRO 0 |
| | Hydrophobic face : none | |
| | Manual mutation | GA mutation |

[Fig. 9]

SEQUENCE LISTING

```
Sequence total quantity: 11
SEQ ID NO: 1            moltype = AA  length = 17
FEATURE                 Location/Qualifiers
source                  1..17
                        mol_type = protein
                        organism = synthetic construct
SEQUENCE: 1
RQRIWFQNRR RSRKIKK                                                      17

SEQ ID NO: 2            moltype = DNA  length = 51
FEATURE                 Location/Qualifiers
source                  1..51
                        mol_type = other DNA
                        organism = synthetic construct
SEQUENCE: 2
cgccagcgca tttggtttca gaaccgccgc cgcagccgca aaattaaaaa a                51

SEQ ID NO: 3            moltype = AA  length = 121
FEATURE                 Location/Qualifiers
source                  1..121
                        mol_type = protein
```

-continued

```
                        organism = synthetic construct
SEQUENCE: 3
QVQLVQSGGG LVQAGGSLRL SCAASGRTFS SDTLAWFRQA PGKEREFVAS ISPSGGVTYY    60
EDSVKGRFTI SRDNSKNTVL LQMNSLTPED TAVYYCNRDP KYGNTRYWGQ GTQVTVSSAA   120
A                                                                  121

SEQ ID NO: 4            moltype = AA  length = 145
FEATURE                 Location/Qualifiers
source                  1..145
                        mol_type = protein
                        organism = synthetic construct
SEQUENCE: 4
MQVQLVQSGG GLVQAGGSLR LSCAASGRTF SSDTLAWFRQ APGKEREFVA SISPSGGVTY    60
YEDSVKGRFT ISRDNSKNTV LLQMNSLTPE DTAVYYCNRD PKYGNTRYWG QGTQVTVSSA   120
AARQRIWFQN RRRSRKIKKH HHHHH                                        145

SEQ ID NO: 5            moltype = DNA  length = 438
FEATURE                 Location/Qualifiers
source                  1..438
                        mol_type = other DNA
                        organism = synthetic construct
SEQUENCE: 5
atgcaggtgc agctggtgca gtctggggga ggattggtgc aggctggggg ttctctgaga    60
ctctcctgtg cagcctctgg acgcaccttc agtagcgata ccctggcgtg gttccgccag   120
gcgccaggga aggagcgtga gtttgtagcg tctattagtc ccagtggtgg tgtcacatac   180
tatgaagact ccgtgaaggg ccgattcacc atctccagag acaacagcaa gaacacggtg   240
ttgctgcaaa tgaacagcct gacacctgag gacacggccg tctattactg taaccgggac   300
cccaagtacg gtaacactag atactggggc caggggaccc aggtcaccgt ctcctcagcg   360
gccgcacgcc agcgcatttg gtttcagaac cgccgccgca gccgcaaaat taaaaaacat   420
caccaccatc accattaa                                                 438

SEQ ID NO: 6            moltype = AA  length = 6
FEATURE                 Location/Qualifiers
source                  1..6
                        mol_type = protein
                        organism = synthetic construct
SEQUENCE: 6
RRPYIL                                                                6

SEQ ID NO: 7            moltype = AA  length = 23
FEATURE                 Location/Qualifiers
source                  1..23
                        mol_type = protein
                        organism = synthetic construct
SEQUENCE: 7
RQRIWFQNRR RSRKIKKRRP YIL                                            23

SEQ ID NO: 8            moltype = AA  length = 18
FEATURE                 Location/Qualifiers
source                  1..18
                        mol_type = protein
                        organism = synthetic construct
SEQUENCE: 8
GRKKRRQRRR PQRRPYIL                                                  18

SEQ ID NO: 9            moltype = AA  length = 18
FEATURE                 Location/Qualifiers
source                  1..18
                        mol_type = protein
                        organism = synthetic construct
SEQUENCE: 9
ARQRIWFQNR RRSRKIKK                                                  18

SEQ ID NO: 10           moltype = AA  length = 16
FEATURE                 Location/Qualifiers
source                  1..16
                        mol_type = protein
                        organism = synthetic construct
SEQUENCE: 10
RQVTIWFQNR RVKEKK                                                    16

SEQ ID NO: 11           moltype = AA  length = 16
FEATURE                 Location/Qualifiers
source                  1..16
                        mol_type = protein
                        organism = synthetic construct
SEQUENCE: 11
RQIKIWFQNR RMKWKK                                                    16
```

PEPTIDE USEFUL FOR THE TRANSPORT OF MOLECULES THROUGH CELL BARRIERS

REFERENCE TO AN ELECTRONIC SEQUENCE LISTING

The present application contains a Sequence Listing that has been submitted electronically and is hereby incorporated by reference in its entirety. The electronic Sequence Listing is named 20250603_Sequence Listing_230347.xml, was created on Jun. 3, 2025, and is 11,426 bytes in size.

TECHNICAL FIELD

The present invention concerns a new peptide and its use as a vector for the transport of molecules of interest after their fusion to said peptide thus forming a fusion protein (hereinafter referred to as conjugated peptide or peptide conjugate) through cellular barriers, in particular the blood-brain barrier (BBB) for the diagnosis, prognosis or treatment of pathologies of the central nervous system (CNS), for example cerebrovascular accidents (CVA), tauopathies, more particularly Alzheimer's disease or Parkinson's disease, etc.

In the description below, the references in square brackets ([ ]) refer to the list of references at the end of the text.

STATE OF THE ART

The brain barriers protect our central nervous system (made up of the brain and of the spine) by controlling oxygen, nutrients, and blocking the entry of the brain-damaging substances or microorganisms. There are 3 barriers between the blood and the central nervous system (CNS): the blood-brain barrier (BBB), the blood-cerebrospinal fluid barrier or choroid plexus (CP) and the arachnoid barrier which serves as an interface between the brain and the cerebrospinal fluid (Abbott et al., Neurobiol. Dis., 37: 13-25, 2010) [1].

The BBB concentrates most of the crossing efforts since it is the major interface between the blood and the CNS. However, the BBB is the main obstacle to the development of new diagnostic or therapeutic molecules targeting the brain. In fact, only 2% of the molecules developed cross it (Pardridge, Molecular Interventions, 3(2): 90-105, 2003) [2] and these are small molecules (<600 Da) (Pardridge, Expert Opinion on Drug delivery, DOI: 10.1517/17425247.2016.1171315, 2006) [3].

The BBB is made up of small capillaries specific to the brain, surrounded by the endothelial cells forming the endothelium, a key element of this barrier.

The total surface area of this endothelium represents 12 to 20 $m^2$, or kilometers of interface between the capillaries and the brain (De Boer and Gaillard, Clin. Pharmacokinet., 46(7): 553-576, 2007) [4]. But crossing this interface is very controlled and selective. Indeed, the endothelial cells are closely joined together by tight junctions, thus forming a real fortress between the capillaries and the brain. The tight junctions are made up of adhesion proteins capable of selecting the molecules that can or cannot cross this endothelium. We then speak of paracellular transport which is opposed to the transcellular transport where the passage occurs by crossing the membrane of the endothelial cells (Patel and Patel, CNS Drugs, DOI: 10.1007//s40263-016-0405-9, 2017) [5].

For this second type of transport, crossing the endothelium can be done by passive diffusion for the small non-polar molecules, liquids and alcohols or via a transporter present on the cell surface such as glucose or amino acids. But when the size of the molecules is too large for the use of a transporter, the passage of the membrane is then done by transcytosis. Certain proteins such as insulin or transferrin link to receptors present on the membrane of the endothelial cells and which mediate the transcytosis. For others lacking receptors, the transcytosis can only take place if these molecules meet the conditions necessary for their adsorption, such as the presence of patches of positive charges on their surface (Patel and Patel, 2017) [5].

Once this endothelium has crossed, the molecules collide, to a lesser extent, with other types of cells constituting the BBB. Indeed, the endothelial cells are partially surrounded by pericytes, contractile cells participating in the structure of the endothelium and capillaries and playing a role in the vasodilation or vasoconstriction of the latter. The communication between the capillaries, pericytes and endothelial cells occurs through the basement membrane. Not being a completely joined layer, the molecules escape more easily.

Finally, the astrocytes which play a role of mediators between the capillaries and neurons, which participate in the formation of the tight junctions with the pericytes and which help to maintain the structure of the BBB and capillaries constitute the last obstacle. But just like pericytes, their assembly is not continuous and their passage is therefore probably not as complex as that of the endothelium.

The search for new molecules targeting a CNS pathology must therefore combine the ability to cross the BBB with biological activity, bio-distribution, low toxicity and its stability. Few molecules achieve this because research almost systematically focuses on the search for a target and a ligand adapted to the problem in a manner disconnected from crossing the BBB. To cross this BBB, several strategies are considered. They are divided into 2 categories, invasive and non-invasive strategies (Dong, Theranostics, 8(6): 1481-1493, 2018) [6]. Among promising non-invasive strategies, we find the use of "Trojan horse" molecules using the receptors on the surface of the BBB or the use of cell penetrating peptides (CPP) adsorbed by transcytosis (Zhou et al., WIREs Nanomed Nanobiotechnol., 13: e1695, 2021) [7].

The peptides, when combined with molecules, including the large molecules such as proteins, are able to increase their brain penetration by increasing their ability to pass through the BBB. Several peptides have been developed for crossing the BBB, linear or cyclic, between 5 and 50 amino acids. Some use the receptors present at the BBB while others use the passive diffusion. The latter, called cell penetrating peptides (CPP), are generally amphipathic and/or cationic and are not specific for the BBB. They nevertheless increase the passage of the molecules through cell membranes and, combined with other strategies to transport them preferentially to the BBB, can be decisive for the delivery of the brain-targeted molecules (Oller-Salvia, Chem. Soc. Rev., 45(17): 4690-4707, 2016) [8].

There therefore remains a great need to identify new drugs to treat the CNS pathologies such as for example cerebrovascular accidents CVA, tauopathies for example Alzheimer's disease or Parkinson's disease. The therapeutic molecules currently being developed for the brain mostly fail to reach their brain target due to their inability to cross the BBB. In addition, nearly a billion people suffer from a neurological disorder (excluding psychiatric disorders). Many molecules effective in vitro have been found for these pathologies but need a vector to enable them to reach their target. The market for the delivery of therapeutic molecules through the BBB will reach US$7.4 billion in 2028 according to Emergen research in 2021.

DESCRIPTION OF THE INVENTION

With the aim of allowing biomolecules to cross the BBB for the diagnosis or therapy of brain pathologies, the inventors have designed by bioinformatics a new CPP (hereinafter referred to as TB peptide) with a three-dimensional structure forming a stable alpha helix, small, with positive charges distributed on the surface and a theoretical isoelectric point greater than 10 (12.70 according to expasy's Protparam online tool)—these criteria being essential for crossing the BBB, the stability of the TB peptide and the proteins of interest to which it is attached.

This TB peptide of amino acid sequence RQRIWFQNRRRSRKIKK (SEQ ID NO: 1), encoded by the nucleotide sequence CGCCAGCGCATTTGGTTTCAGAACCGCCGCCGCAGCCGCAAAATTAAAAAA (SEQ ID NO: 2), demonstrated its ability to transport through the BBB a molecule of interest, namely the 2C5 nanobody (VHH, MW=10-15 kDa) of amino acid sequence QVQLVQSGGGLVQAGGSLRLSCAASGRTFSSDTLAWFRQAPGKEREFVASISPSG GVTYYEDSVKGRFTISRDNSKNTVLLQMNSLTPEDTAVYYCNRDPKYGNTRYWGQ GTQVTVSSAAA (SEQ ID NO: 3) capable of detecting the pathological forms (oligomeric form) of the Tau protein (Patent Application FR 3058143) [9], after fusion.

The resulting 2C5-TB peptide conjugate has the amino acid sequence (SEQ ID NO: 4)
MQVQLVQSGGGLVQAGGSLRLSCAASGRTFSSDTLAWFRQAPGKEREFVA

SISPSGGVTYYEDSVKGRFTISRDNSKNTVLLQMNSLTPEDTAVYYCNRD

PKYGNTRYWGQGTQVTVSSAAARQRIWFQNRRRSRKIKKHHHHHH*, encoded by the nucleotide sequence (SEQ ID NO: 5)
ATGCAGGTGCAGCTGGTGCAGTCTGGGGGAGGATTGGTGCAGGCTGGGGG

TTCTCTGAGACTCTCCTGTGCAGCCTCTGGACGCACCTTCAGTAGCGATA

CCCTGGCGTGGTTCCGCCAGGCGCCAGGGAAGGAGCGTGAGTTTGTAGCG

TCTATTAGTCCCAGTGGTGGTGTCACATACTATGAAGACTCCGTGAAGGG

CCGATTCACCATCTCCAGAGACAACAGCAAGAACACGGTGTTGCTGCAAA

TGAACAGCCTGACACCTGAGGACACGGCCGTCTATTACTGTAACCGGGAC

CCCAAGTACGGTAACACTAGATACTGGGGCCAGGGGACCCAGGTCACCGT

CTCCTCAGCGGCCGCA**CGCCAGCGCATTTGGTTTCAGAACCGCCGCCGCA

GCCGCAAAAT**TAAAAAA*CATCACCACCATCACCATTAA*, where the sequence of the 2C5 nanobody is the one underlined, the sequence of the TB peptide is that in bold and the sequence in italics is a polyhistidine tag comprising at least 6 histidine residues. It should be noted that 3 alanines are added after the sequence of 2C5 ending with TVSS and before the sequence of the Tb peptide starting with RQR, to serve as a linker. However, this linker is not essential for the proper transport of the molecule of interest through the BBB (data not represented).

This TB peptide of amino acid sequence RQRIWFQNRRRSRKIKK (SEQ ID NO: 1), encoded by the nucleotide sequence CGCCAGCGCATTTGGTTTCAGAACCGCCGCCGCAGCCGCAAAATTAAAAAA (SEQ ID NO: 2), has also demonstrated its ability to transport through the BBB a second molecule of interest, namely neurotensin (NT), of amino acid sequence RRPYIL (SEQ ID NO: 6), which is a neuropeptide causing a hypothermia when present in the brain but which alone is incapable of crossing the BBB. Accordingly, the resulting TB-NT peptide conjugate, corresponding to the amino acid sequence RQRIWFQNRRRSRKIKKRRPYIL (SEQ ID NO: 7), where the sequence of the neurotensin (NT) is the one underlined and the sequence of the TB peptide is the one in bold.

This TB peptide therefore represents an effective vector capable of transporting through cellular barriers, in particular the BBB, molecules of interest for diagnostic, prognostic and therapeutic purposes of CNS pathologies which for the most part fail to reach their brain target in due to their inability to cross the BBB alone, as in the case of the 2C5 nanobody and of the neurotensin (NT).

The subject of the present invention is therefore a peptide comprising or consisting of a peptide of amino acid sequence SEQ ID NO 1.

Said peptide can be synthesized by any method known to those skilled in the art, for example using a peptide synthesizer or by gene synthesis, insertion thereof into an expression vector and expression in a bacterial, cellular or acellular system.

The present invention also relates to a peptide conjugate comprising or consisting of a peptide according to the invention, where said peptide is covalently linked to a molecule of interest, directly or via a linker.

According to a particular embodiment of the present invention, said linker, when present, is chosen from the group consisting of peptides, polymers or chemical agents allowing cross-linking. Preferably said linker, when present, is composed of 1 to 6 amino acids, preferably 3 amino acids, preferentially 3 alanines.

According to a particular embodiment of the present invention, the molecule of interest is chosen from the group consisting of any chemical or biological molecule of diagnostic, prognostic or therapeutic interest. For example, it can be an antibody (e.g. a nanobody), a DNA, an RNA, a peptide (e.g. analgesic, anesthetic, e.g. neurotensin), a drug (e.g. inhibitors of BACE1 (beta-site APP cleaving enzyme 1) or Gamma-secretases). Preferably, the nanobody is an anti-Tau nanobody capable of linking early pathological forms of the human Tau protein while being devoid of the ability to cross the BBB, preferably a Tau nanobody of amino acid sequence SEQ ID NO: 3.

According to a particular embodiment of the present invention, the peptide conjugate comprises or consists of the sequence SEQ ID NO: 4.

According to the invention, the molecule of interest linked to the TB peptide can be a neuropeptide (e.g. analgesic, anesthetic, e.g. neurotensin). Preferably, said neuropeptide is a neurotensin capable of causing hypothermia when present in the brain while lacking the ability to cross the BBB, preferably a neurotensin (NT) of amino acid sequence SEQ ID NO: 6.

According to a particular embodiment of the present invention, the peptide conjugate comprises or consists of the sequence SEQ ID NO: 7.

The present invention also relates to a peptide conjugate according to the present invention for use as a drug. In particular, the peptide conjugate is useful in the diagnosis, prognosis, or treatment of a pathology of the central nervous system (CNS).

According to a particular embodiment of the present invention, the pathology of the CNS is chosen from the group consisting of brain tumors, cerebrovascular accidents (CVA), multiple sclerosis, Huntington's disease and tauopathies. For example, tauopathy is chosen from the group consisting of Parkinson's disease, Alzheimer's disease, Pick's disease.

The present invention also relates to a nucleic acid sequence encoding a peptide or a peptide conjugate according to the present invention, preferably the nucleic acid sequence comprises or consists of the sequence SEQ ID NO: 2 or the sequence SEQ ID NO: 5, respectively.

The present invention also relates to an expression vector comprising a nucleic acid sequence according to the present invention, for example the pET15b plasmid.

EXAMPLES

Example 1: Design of a New CPP: THT TB Peptide

Protein Sequence of the TB Peptide

The sequence of the TB peptide was modeled in 3D using the COOT program to form a stable alpha helix with many positive charges distributed on the surface, with a theoretical isoelectric point (pI) close to 13 (12.70 after protparam) in order to subsequently lower the pI of the molecules of interest which are fused to it.

The TB peptide was then synthesized by gene synthesis and produced in bacterial system or by peptide synthesis using a synthesizer.

Figure 1:
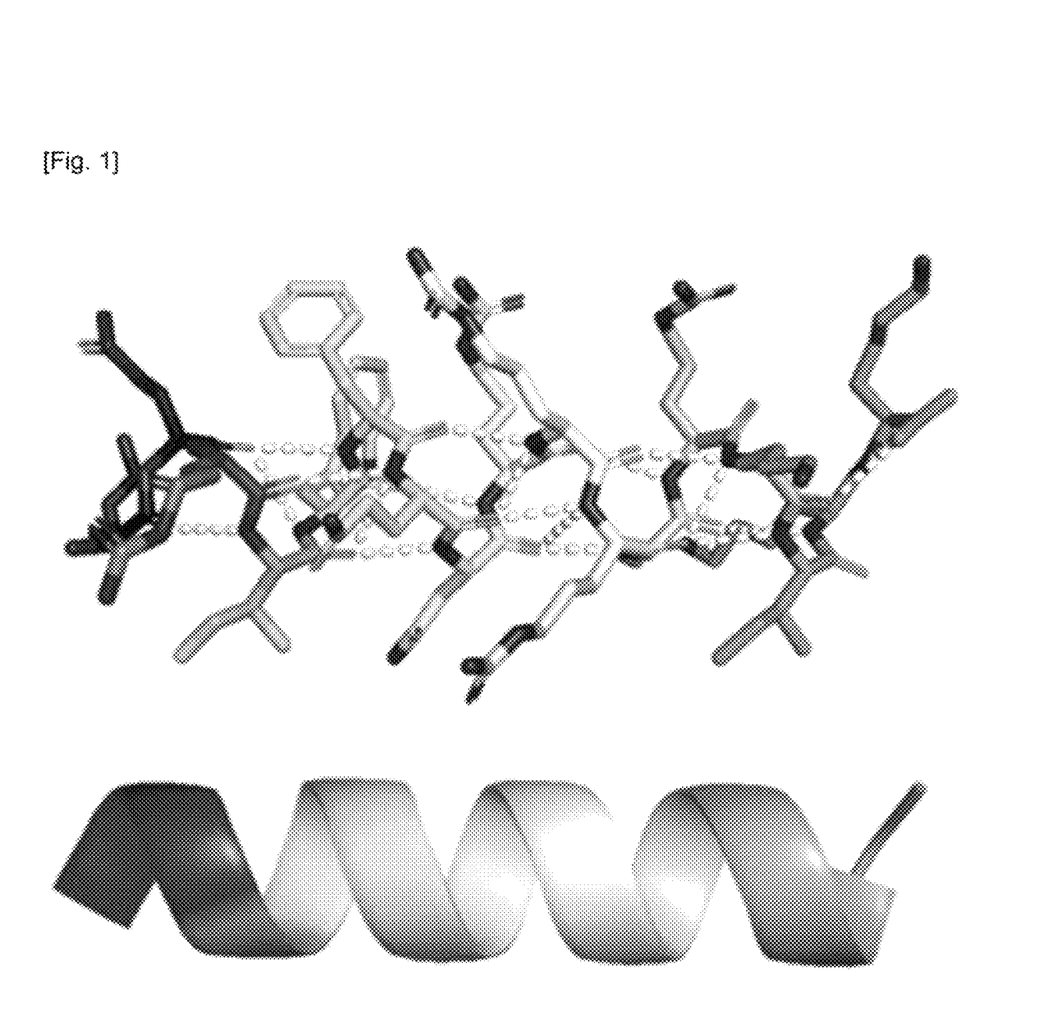
FIG. 1 represents the three-dimensional structure of the TB peptide.

Resulting Three-Dimensional Structure (FIG. 1)

Figure 2:
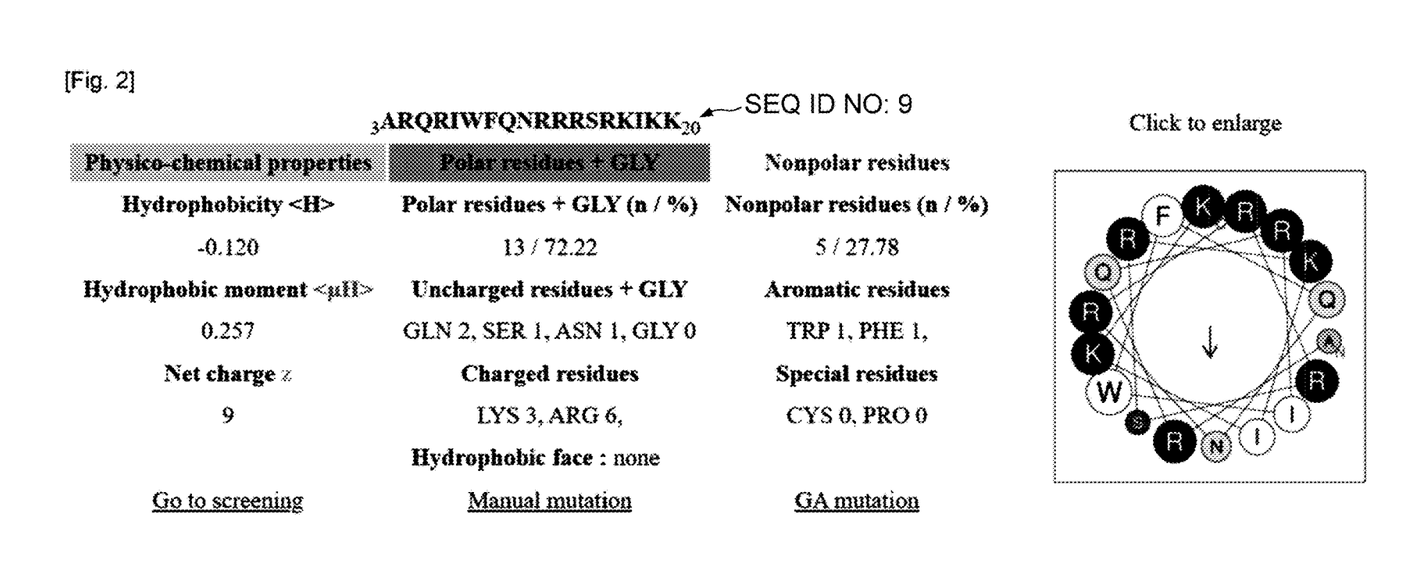
FIG. 2 represents the confirmation of the alpha helix of the TB peptide (amino acids 2-18 of SEQ ID NO: 9) by the PepFold and heliquest programs.

The alpha helix of the TB peptide was confirmed by the PepFold and heliquest programs (FIG. 2).

The TB peptide was designed in silico so as to have positive charges better distributed on its surface, better solubility in aqueous solvents and a more structurally stable α-helix. All of these properties allow the TB peptide, as well as all its conjugates, to have an increased solubility in the aqueous solvents, for use in vivo. Ultimately, TB and its various conjugates have a greater capacity to cross the BBB than for any other known CPP.

Figure 8:
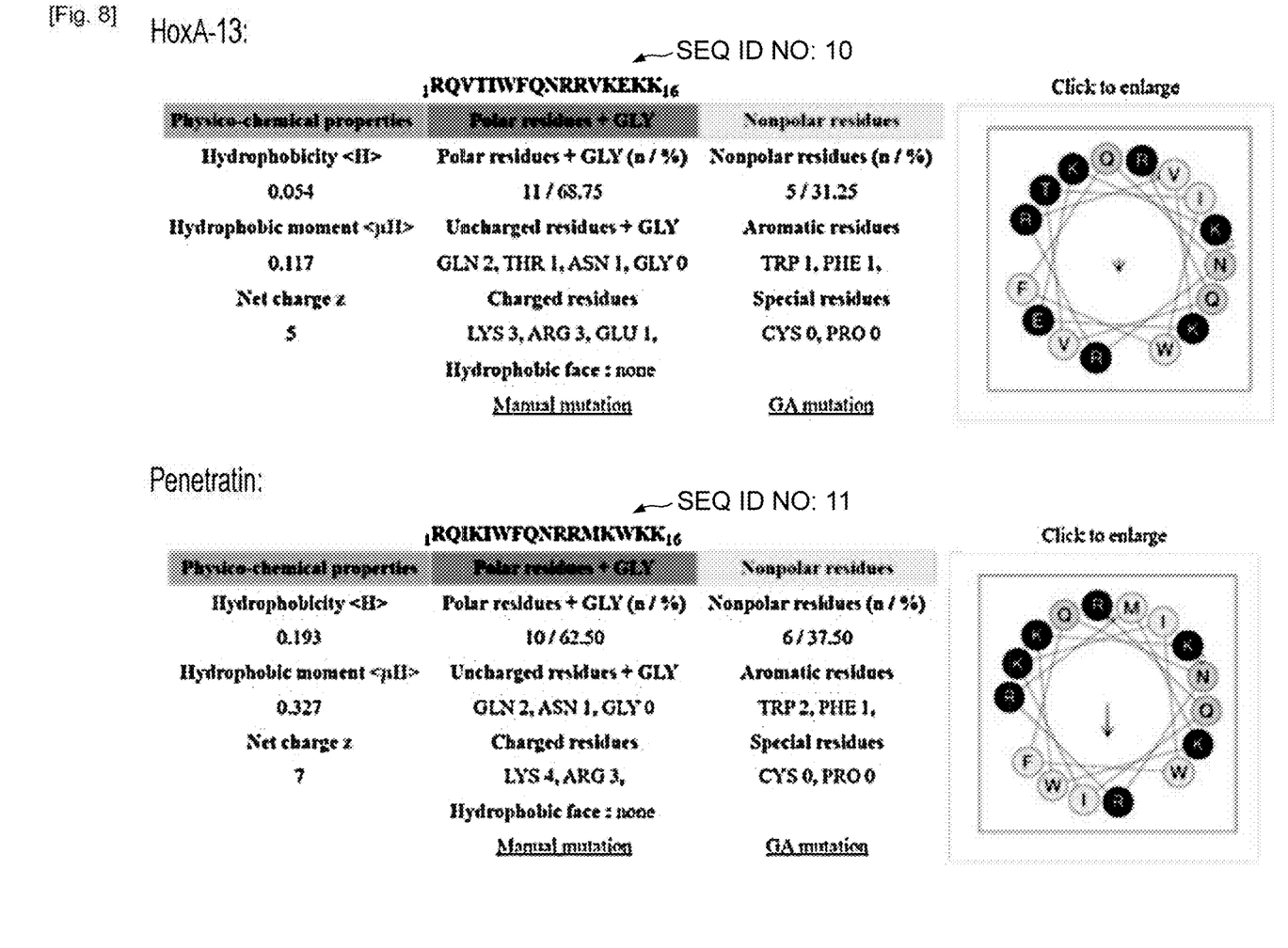
FIG. 8 represents the data of the HoxA-13 (SEQ ID NO: 10) peptides and penetratin (SEQ ID NO: 11) obtained by the heliquest program.

In this sense, by comparing the properties of the TB peptide to those of two other known CPPs, the HoxA-13 peptide and penetratin, we see that the TB peptide has negative hydrophobicity unlike HoxA-13 and penetratin (FIG. 8). This difference gives the TB peptide a solubility in the aqueous solvents, unlike HoxA-13 and penetratin, allowing it to cross the BBB, particularly when it is linked to a molecule of interest, such as the nanobody (2C5) or neurotensin (NT).

Example 2: Fusion of the TB Peptide to a Nanobody

Fusion of the TB Peptide to a Nanobody that does not Pass the BBB

To evaluate the diffusion capacity through a differentiated cellular BBB model, the TB peptide was fused to a nanobody (2C5) not passing this model but whose target is cerebral (International application WO 2018/078140) [11].

Figure 3:
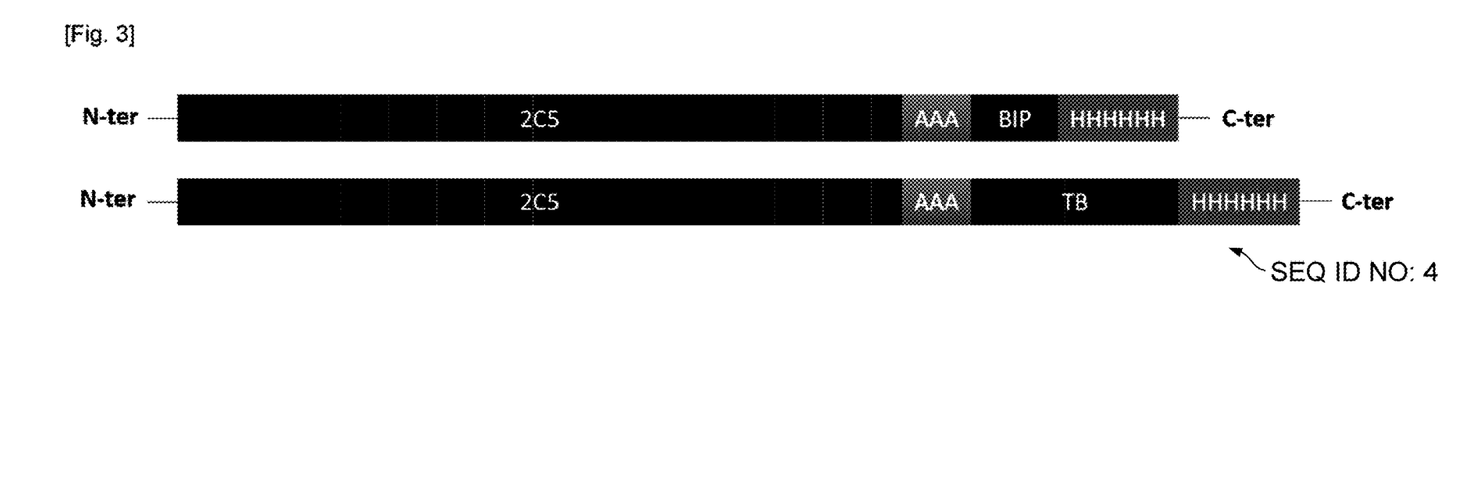
FIG. 3 represents the conjugates comprising the TB (SEQ ID NO: 4) or BIP peptide fused to the 2C5 nanobody.

The conjugation of the TB peptide to the 2C5 nanobody was carried out by gene fusion such that the resulting protein is composed, from the N-terminus to the C-terminus, of the 2C5 nanobody, of a linker composed of 3 alanines, of the peptide TB and a 6 histidine tag. A similar fusion with a promising CCP according to Cho, 2017 [9], the BIP peptide, was also carried out (FIG. 3).

The corresponding genes were inserted into the pET15b plasmid using the NcoI/BamHI restriction enzymes (data not represented).

Production of 2C5 Nanobodies, and 2C5-TB and 2C5-BIP Peptide Conjugates

The plasmids encoding the 3 proteins (2C5, 2C5-TB and 2C5-BIP) were inserted into E. coli Shuffle bacteria (Biolabs) according to the supplier's protocol.

From a colony resulting from the transformation, a preculture was carried out in a volume of 25 mL of LB containing 100 μg/mL of ampicillin. This preculture was incubated overnight at 37° C. with stirring at 190 rpm.

The following day a 1 L culture was carried out by diluting the 25 mL of preculture in LB containing 100 μg/mL of ampicillin. The preculture was incubated at 37° C. with stirring at 190 rpm and, when the optical density measured at 600 nm reached 0.8, 1 mM of IPTG was added to induce the T7 promoter of pET15b plasmid. The culture was incubated for an additional 3 hours under the same conditions.

The bacteria were collected after 3 hours of induction, by centrifugation for 40 min at 9500 G. The supernatant was eliminated and the bacterial pellet was resuspended in 40 mL of lysis buffer (50 mM Tris HCl pH9 for 2C5-TB and pH8 for 2C5 and 2C5-BIP, 250 mMNaCl, 30 mM imidazole, 1 mg/ml lysozyme, 2 tablets of complete EDTA free antiprotease (Roche) and 1 μL of benzonase). The suspension was placed at 4° C. for 1 hour with gentle stirring to allow lysis under the action of lysozyme. An additional sonication step was then carried out and the soluble fraction containing the nanobodies or conjugates was collected by centrifugation for 40 min at 9500 G.

The nanobodies having a poly-histidine tail, the nanobodies and conjugates were purified on a Ni-NTA agarose affinity resin (Qiagen). The soluble fraction was loaded into a gravity column containing 1 mL of Ni-NTA resin pre-equilibrated in TpA (50 mM Tris HCl pH9 for 2C5-TB and pH8 for 2C5 and 2C5-BIP, 250 mM NaCl, 30 mM Imidazole). Then the resin was washed using 150 mL of TpA and the nanobodies and conjugates were eluted by addition of 250 mM of imidazole in TpA.

Fractions of 1 mL were collected and those containing the nanobodies or conjugates after analysis on a 18% SDS gel were combined and injected onto a Superdex 75 10/300 column for a second purification step on a Biorad NGC FPLC system, in PBS buffer.

The fractions containing the nanobodies or conjugates, more than 95% pure, were combined and collected at 1 mg/ml for the 2C5 nanobodies and the 2C5-BIP conjugates and at 0.8 mg/ml for the 2C5-TB conjugates.

Figure 4:
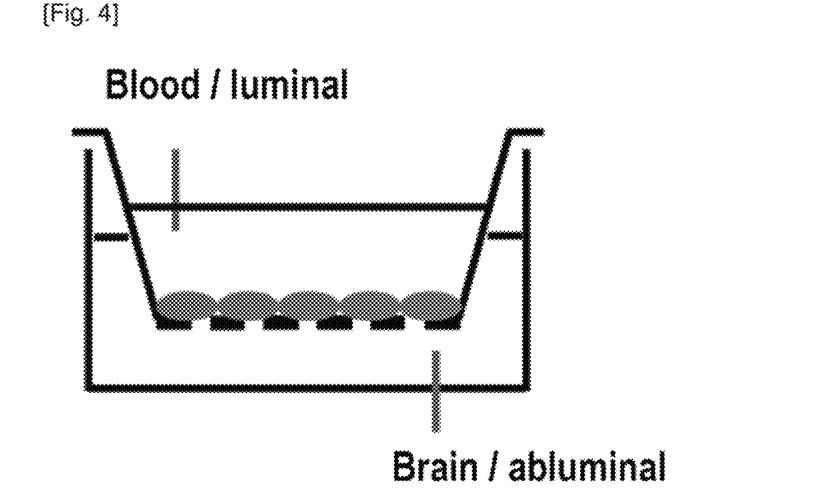
FIG. 4 represents the cellular model of the BBB.

Evaluation of the Passage of the Nanobodies and Peptide Conjugates Through a Differentiated Cellular BBB Model (FIG. 4)

Cerebral microvessel endothelial cells prepared from 5-week-old male rats were seeded on microporous filters in order to:
- evaluate the toxicity of the nanobodies and conjugates during their transfer by kinetic measurement of the sucrose transfer.
- evaluate the permeability of the nanobodies and conjugates in the blood/brain direction.

Experimental Conditions:
- The endothelial cells were seeded on 28 Transwell Polycarbonate filters (porosity 0.4 µm and diameter 12 mm), and cultured in differentiation medium.
- The measurement of toxicity (study A) or permeability (study B) of the nanobodies and conjugates was carried out in HBSS Ca/Mg medium supplemented with 0.1% BSA. The transfer volumes were respectively 280 and 1200 pl for the donor luminal compartment and the acceptor basolateral compartment.
- The nanobodies and conjugates were diluted in the same HBSS Ca/Mg—0.1% BSA buffer.
- The transfer was initiated by adding the nanobodies or conjugates to the upper compartment and transferring the filter to a well containing HBSS Ca/Mg—0.1% BSA.
- The integrity of control monolayers or those exposed to nanobodies or conjugates (study A) was evaluated by measuring the sucrose permeability through a kinetic analysis over 2 hours (comparable to the time used to estimate the permeability of the nanobodies and conjugates).
- The luminal and abluminal media collected for study B were analyzed by ELISA test.

The groups are as follows:

TABLE 1

| Groups/number of fibers | Study | |
|---|---|---|
| | A. Toxicity of the nanobodies and conjugates | B. Permeability of the nanobodies and conjugates |
| Luminal sampling vol/time | 50 µl/120 min | 20 µl/8 min<br>250 µl/120 min |
| Abluminal sampling vol/time | 900 µl/15, 30, 45, 60, 90, 120 min | 250 µl/60 min<br>total vol/120 min |

For study B, the medium collected at 60 min basolaterally was replaced by the same volume of fresh medium.

Figure 5:
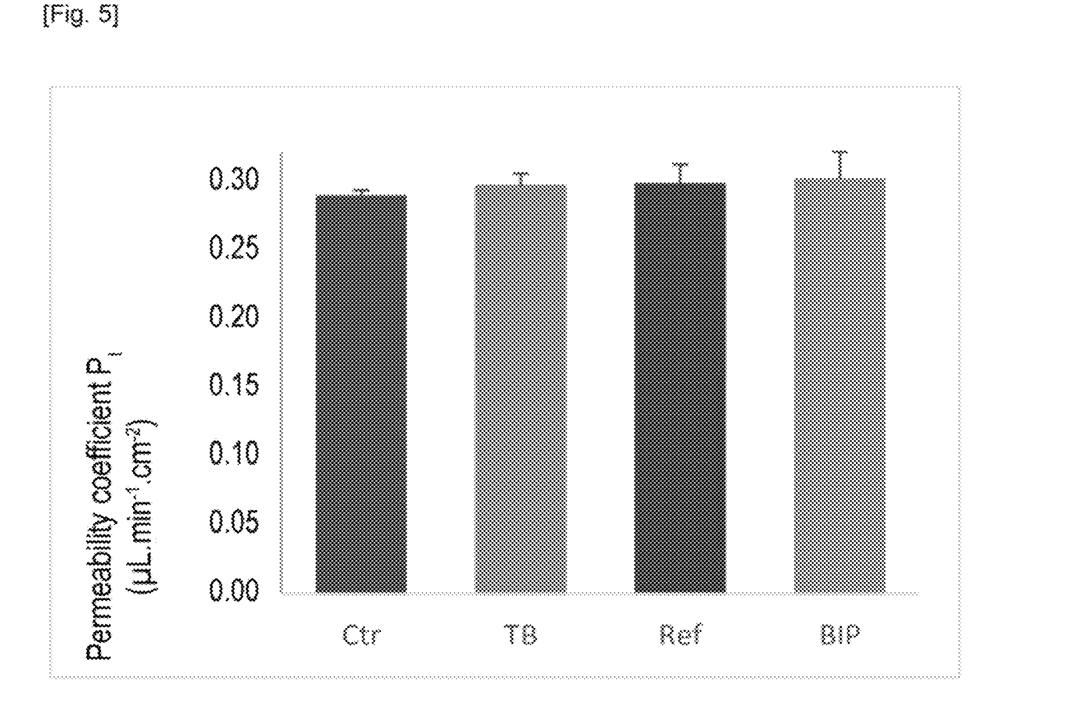
FIG. 5 represents the effect of the nanobodies and conjugates (2C5, 2C5-TB and 2C5-BIP) on the sucrose permeability of the endothelial cells.
Figure 6:
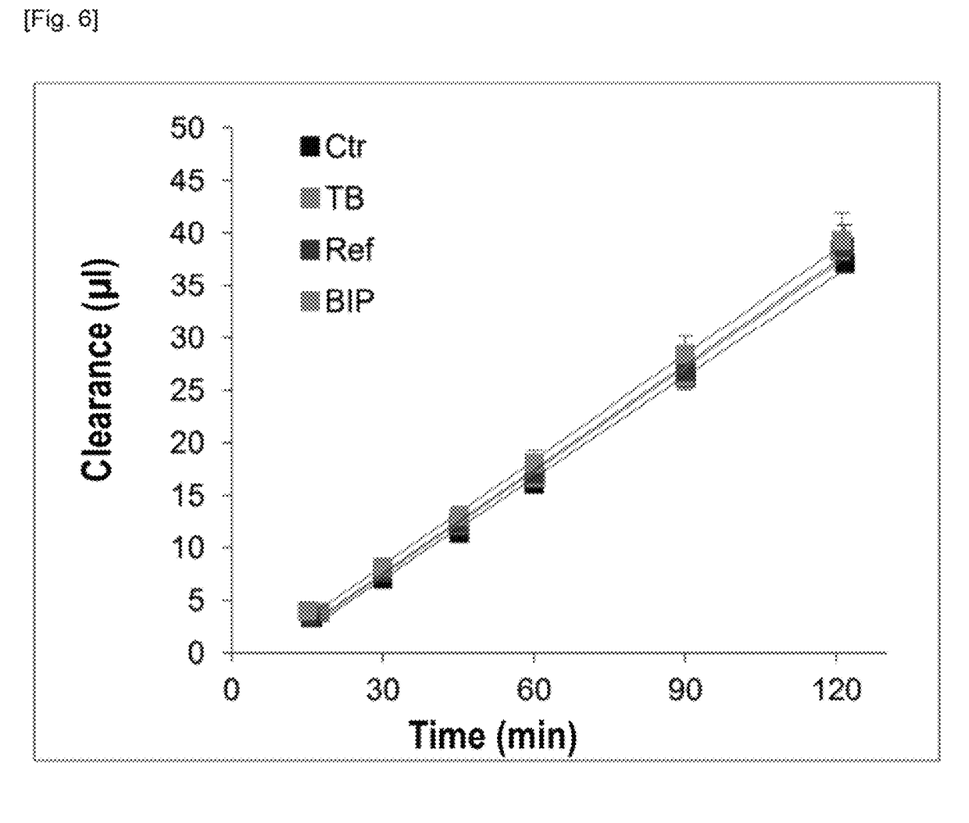
FIG. 6 represents the sucrose clearance curves through the endothelial cells exposed to the nanobodies and conjugates (2C5, 2C5-TB and 2C5-BIP).

Results of Study A:
The sucrose permeability of the endothelial cells reflecting the integrity of the tight junctions was not modified in the presence of the nanobodies and conjugates (FIG. 5). The clearance curves averaged for the 4 filters were linear for the four filter groups (FIG. 6).

These results demonstrated that the three nanobodies and conjugates (2C5, 2C5-TB and 2C5-BIP) tested do not have an acute deleterious effect on the permeability of the endothelial cells to sucrose. They therefore validate the possible differences observed within the values of the permeability coefficients for the 3 nanobodies and conjugates tested.

Results of Study B:
The samples collected at 60 and 120 min were analyzed by ELISA test to evaluate the quantity of nanobodies and conjugates which passed during study B. To be able to analyze the different samples by ELISA, it was necessary to first purify them to remove BSA limiting adhesion to 96-well plates of ELISA test. Thanks to the polyhistidine label present on the 3 nanobodies and conjugates, purifications on a 96-well plate coated with Nickel-NTA were carried out.

The purifications were carried out as follows:
- Incubation of the samples for 1 hour at 4° C. on the Ni-NTA plate.
- Elimination of "unretained" fractions by pipetting.
- 3 washes of 200 µL in PBS+30 mM imidazole buffer.
- Incubation for 30 min with 200 µL of PBS+300 mM imidazole elution solution.
- Transfer of the elutions to 96-well plates for ELISA tests.

In parallel, concentration ranges of the different nanobodies and conjugates were carried out and incubated on the same 96-well plates as the previous elutions, overnight at 4° C. The following day, the non-adsorbed fractions were removed by inversion and blocking was carried out with a solution of PBS+1% BSA for 1 hour at 23° C. A solution of PBS+1% BSA containing anti-histidine and HRP-coupled antibodies replaced the blocking solution and an incubation for 1 hour at 23° C. was carried out to allow the antibodies to link to the nanobodies and conjugates present. 3 washes in PBS+0.1% tween were then carried out to eliminate the elements not retained and a TMB solution was added to reveal the ELISA tests by colorimetry.

An absorbance reading was carried out at 450 nm after stopping the colorimetric reaction using a 1 N HCl solution.

Figure 7:
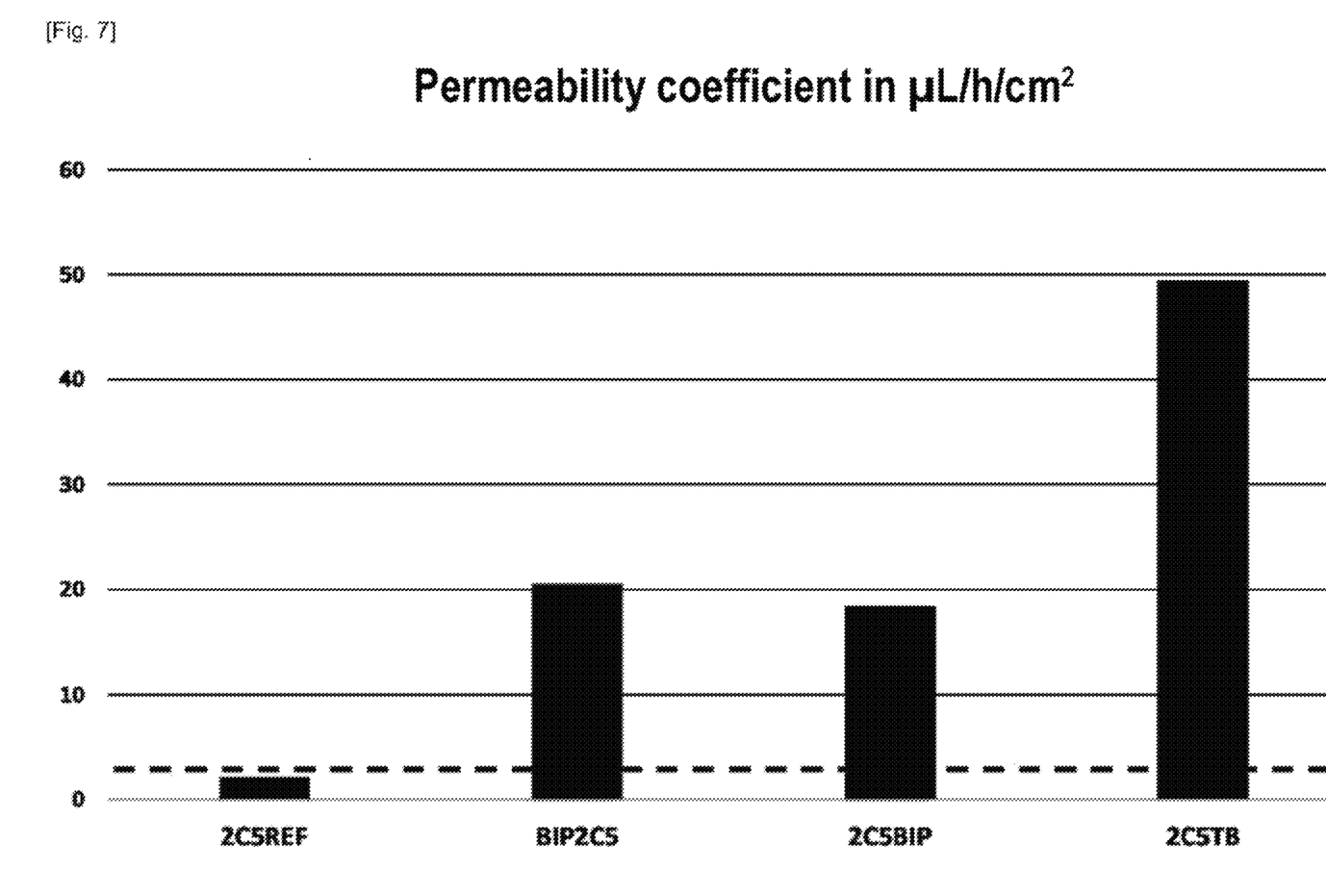
FIG. 7 represents the permeability coefficient in $\mu L/h/cm^2$ of the nanobodies and conjugates (2C5, 2C5-TB and 2C5-BIP).

The concentration ranges carried out made it possible to trace the absorbance curves as a function of the concentration of nanobodies and conjugates and to determine the limit of linearity as well as the coefficient making it possible to pass from the absorbances to the concentrations in the samples taken during the study B. To be able to compare the quantities of nanobodies and conjugates passed, the concentrations of the wells were then converted into quantities of nanobodies and conjugates passed per hour and per cm² of model. In order to compare these values to the references (a dextran of 15000 Da and sucrose), the diffusion of the nanobodies was finally expressed as a permeability coefficient, i.e. in $\mu L/h/cm^2$ (FIG. 7).

These results demonstrated the ability of the 2C5-TB conjugate to pass through the BBB. Thus the TB peptide has demonstrated its capacity as a vector to transport through the BBB a molecule of interest that does not pass the BBB when administered alone.

Furthermore, comparative studies, in which the 2C5 nanobody was fused to HoxA-13 and penetratin, confirmed the unique ability of the TB peptide to be a transport vector through the BBB, of a molecule of interest such as the 2C5 nanobody. Indeed, the peptide conjugates 2C5-penetratin and 2C5-HoxA-13 could not be completely solubilized during the lysis step of the bacteria used for its production (method identical to that of the 2C5-TB conjugate), thus revealing an inability (or at least a very low capacity) to cross the BBB. Therefore, these studies have confirmed that among these three cell penetrating peptides (CPP), only the TB peptide of the invention allows, when conjugated to the 2C5 nanobody, the transport of this molecule of interest through the BBB.

Example 3: Fusion of the TB Peptide to a Neurotensin

Fusion of the TB Peptide to a Neuropeptide that does not Pass the BBB Sequences of the Different Peptides Used

```
NT:
                                        (SEQ ID NO: 6)
RRPYIL

TB:
                                        (SEQ ID NO: 1)
RQRIWFQNRRRSRKIKK

TAT-NT:
                                        (SEQ ID NO: 8)
GRKKRRQRRRPQRRPYIL

TB-NT:
                                        (SEQ ID NO: 7)
RQRIWFQNRRRSRKIKKRRPYIL
```

Method

The neurotensin (NT) is a neuropeptide that causes hypothermia when present in the brain but is unable to reach the brain from the periphery on its own. This peptide, if fused to TB, can thus serve as a reporter for crossing the BBB. For this, the TB, NT and TB-NT peptides were synthesized using a peptide synthesizer and the dose of 2.5 mmol/kg was injected intravenously into mice (n=4 to 6). Body temperature was monitored using Anipill® capsules previously implanted intraperitoneally.

These data were studied in comparison to those carried out with the reference cell penetration peptide TAT, also fused to NT neurotensin. The resulting TAT-NT conjugate was used as a positive control, in order to compare the capacity of TB to make NT cross the BBB, with regard to that of the TAT peptide. The TAT peptide, originating from the human immunodeficiency virus (HIV), was shown in 1999 to be capable of transporting a conjugate through the BBB [10].

The graph resulting from this study (FIG. 9) shows the variations in body temperature of the mice after their intravenous injection of the different peptides. The monitoring was carried out over 90 minutes.

Results

Figure 9:
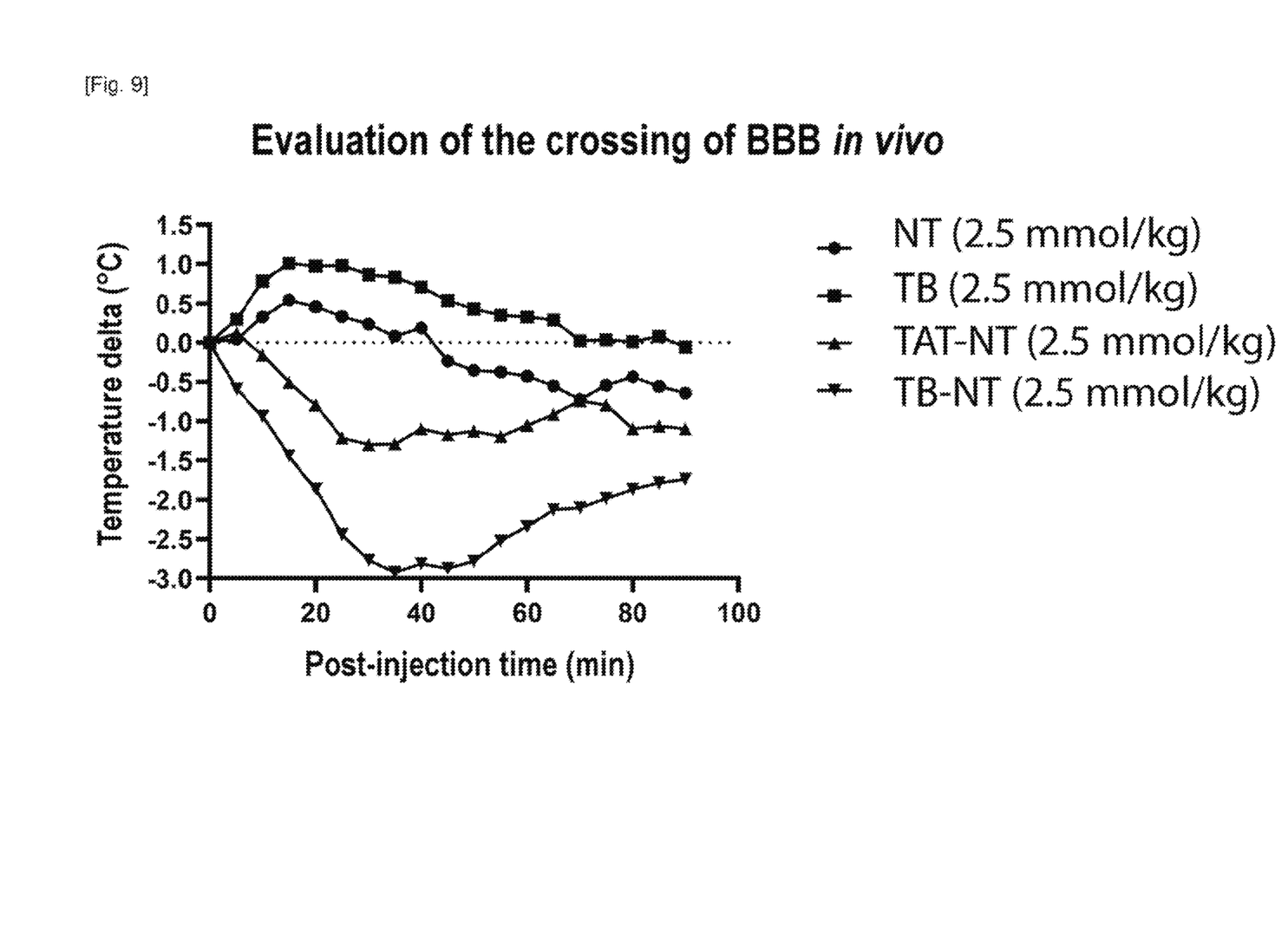
FIG. 9 represents the body temperature variation curves of mice after their intravenous injection of the different peptides (NT, TB, TAT-NT and TB-NT).

Mice that received NT alone do not show any variation in temperature in the minutes following the injection and confirms the absence of passage from the blood to the brain of this peptide alone. In other words, this curve confirms the inability of NT to cross the BBB alone.

Mice that received TB alone showed no signs of hypothermia.

Mice that received NT fused to TAT showed hypothermia of approximately 1 degree Celsius, observed after 30 minutes following injection. This confirms the ability of the TAT peptide to transport a conjugate through the BBB.

Nevertheless, mice that received NT fused to TB showed greater hypothermia of approximately 3 degrees Celsius, observed after 35 minutes following injection. Thus, this reflects a capacity of the TB peptide to make a molecule of interest such as neurotensin cross the BBB which is significantly greater than that of the TAT peptide.

All animals returned to a similar body temperature after 2 hours and 30 minutes.

LIST OF REFERENCES

1. Abbott et al., Neurobiol. Dis., 37: 13-25, 2010
2. Pardridge, Molecular Interventions, 3(2): 90-105, 2003
3. Pardridge, Expert Opinion on Drug delivery, DOI: 10.1517/17425247.2016.1171315, 2016
4. De Boer and Gaillard, Clin. Pharmacokinet., 46(7): 553-576, 2007
5. Patel and Patel, CNS Drugs, DOI: 10.1007//s40263-016-0405-9, 2017
6. Dong, Theranostics, 8(6): 1481-1493, 2018
7. Zhou et al., WIREs Nanomed Nanobiotechnol., 13: e1695, 2021
8. Oller-Salvia, Chem. Soc. Rev., 45(17): 4690-4707, 2016
9. Patent Application FR 3058143
10. Schwarze et al., 1999

The invention claimed is:

1. A peptide comprising a peptide of amino acid sequence SEQ ID NO 1.

2. A peptide conjugate comprising the peptide according to claim 1, wherein the peptide is covalently linked to a molecule of interest, directly or via a linker.

3. The peptide conjugate according to claim 2, wherein the linker is composed of 1 to 6 amino acids.

4. The peptide conjugate according to claim 2, wherein the molecule of interest is chosen from the group consisting of an antibody, a DNA, an RNA, a peptide, and a drug.

5. The peptide conjugate according to claim 4, wherein the antibody is a single domain antibody.

6. The peptide conjugate according to claim 5, wherein the single domain antibody is an anti-Tau single domain antibody that comprises the amino acid sequence SEQ ID NO: 3.

7. The peptide conjugate according to claim 6 comprising the amino acid sequence SEQ ID NO: 4.

8. A nucleic acid sequence encoding the peptide according to claim 1, wherein the nucleic acid sequence further encodes a molecule of interest, and wherein the peptide is covalently linked to the molecule of interest directly or via a linker further encoded by the nucleic acid sequence.

9. An expression vector comprising a nucleic acid sequence as defined in claim 8.

10. A method comprising
diagnosing, prognosing, or treating a pathology of the central nervous system (CNS) with the peptide conjugate according to claim 2.

11. The method according to claim 10, wherein the CNS pathology is chosen from the group consisting of brain tumors, cerebrovascular accidents (CVA), Huntington's disease, multiple sclerosis and tauopathies.

12. The method according to claim 11, wherein the tauopathies are chosen from the group consisting of Parkinson's disease, Pick's disease, and Alzheimer's disease.

* * * * *